United States Patent [19]

Stoltzfus et al.

[11] Patent Number: 5,738,830
[45] Date of Patent: Apr. 14, 1998

[54] METHOD AND APPARATUS FOR PRODUCTION OF POWDERS

[75] Inventors: Joel M. Stoltzfus, Mesilla Park, N. Mex.; Subhasish Sircar, Richmond, Va.

[73] Assignee: The United States of America as represented by the Administrator of the National Aeronautics and Space Administration, Washington, D.C.

[21] Appl. No.: 785,500

[22] Filed: Jan. 17, 1997

Related U.S. Application Data

[62] Division of Ser. No. 413,732, Mar. 29, 1995, Pat. No. 5,635,153.

[51] Int. Cl.⁶ .................................................... C01B 13/32
[52] U.S. Cl. .................... 422/111; 422/112; 422/150; 422/232; 422/233; 423/592
[58] Field of Search .................................... 422/111, 112, 422/109, 150, 232, 233; 423/592

[56] References Cited

U.S. PATENT DOCUMENTS

| | | | |
|---|---|---|---|
| 3,992,138 | 11/1976 | Leisner | 432/231 |
| 4,964,791 | 10/1990 | Sakuno et al. | 425/8 |
| 4,990,312 | 2/1991 | Rucker et al. | 422/78 |

*Primary Examiner*—Timothy McMahon
*Attorney, Agent, or Firm*—Hardie R. Barr

[57] ABSTRACT

Apparatus and method are disclosed for producing oxides of metals and of metal alloys. The metal or alloy is placed in an oxygen atmosphere in a combustion chamber and ignited. Products of the combustion include one or more oxides of the metal or alloy in powdered form. In one embodiment of the invention a feeder is provided whereby material to be oxidized by combustion can be advanced into a combustion chamber continuously. A product remover receives the powder product of the combustion.

7 Claims, 2 Drawing Sheets

METHOD AND APPARATUS FOR PRODUCTION OF POWDERS

This is a division of application Ser. No. 08/413,732, filed Mar. 29, 1995 now U.S. Pat. No. 5,635,153.

ORIGIN OF THE INVENTION

The invention descibed herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention pertains to methods and apparatus for producing powders. More particularly, the present invention relates to techniques for producing metal or metal-alloy oxide powders by combustion.

2. Description of Prior Art

Metal oxide powders find use in chemical laboratories and in manufacturing processes. Various techniques are available for manufacturing oxides, depending on the oxide to be produced. Such techniques include reduction of ores, vaporizing metals in air followed by oxidation of the metal vapor, burning compounds that are flammable in air, and various processes involving roasting, leaching, purification and/or precipitation, for example. U.S. Pat. No. 5,114,702 issued May 19, 1992, discusses a technique for making metal oxide ceramic powders by forming an aqueous solution of a metal salt and a combustible co-reactant compound such as an amino acid, allowing the excess water to evaporate, and heating the resulting concentrated material to its autoignition temperature.

Existing methods for producing metal oxide powders generally comprise multistep processes requiring elaborate apparatus, and are relatively time consuming, expensive and cumbersome. It would be advantageous and desirable to be able to produce large amounts of metal and metal-alloy oxide powders with a minimal number of process steps. The present invention provides a technique for so producing oxide powders utilizing combustion of the metal or metal alloy of which an oxide is to be produced.

U.S. Pat. No. 3,992,138 issued Nov. 16, 1976, discloses a particular construction of a combustion chamber. U.S. Pat. No. 3,975,184 issued Aug. 17, 1976, discloses method and apparatus for producing metallic powders using an electric arc furnace. U.S. Pat. No. 4,374,075 issued Feb. 15, 1983, is directed to a method of producing atomized particles of metals and alloys by use of a plasma arc gas jet. U.S. Pat. No. 4,964,791 issued Oct. 23, 1990, discloses apparatus for making powder in a hermetically sealed container using a plasma torch.

A combustion chamber is disclosed in U.S. Pat. No. 4,990,312 issued Feb. 5, 1991, and naming as a joint inventor one of the joint inventors of the present invention. The disclosure of the '312 patent is directed to testing apparatus for evaluating materials for exposure to high pressure gases, including inert or oxidizing gases.

SUMMARY OF THE INVENTION

The present invention provides a technique for producing oxide powders of metal and of alloys. In a method of the invention a material of which an oxide is to be made is positioned in a housing. The material, which may be a metal or a metal alloy, is provided in the form of a rod. An igniter is applied to the material, and the material is exposed to an oxygen atmosphere, or an atmosphere enriched with oxygen. The igniter is operated to cause combustion of the material to produce powdered oxide of the material.

The housing may be provided in the form of a combustion chamber. An entry port through the wall of the chamber allows introduction of oxygen to the interior of the chamber. The igniter is selectively, electrically operable for igniting the material. A thermoelectric element, as part of the igniter, is applied to the material and is connected to a power source external to the housing by appropriate electrical conductors passing through the wall of the housing. A pressure sensor is exposed to the pressure of gas in the housing, and a pressure regulator is used to control the pressure within the chamber. At the moment of ignition the material in the chamber may be exposed to oxygen pressure at any selected value from atmospheric pressure to some value in excess of atmospheric pressure.

The material of which oxide powder is to be made may be suspended within the chamber. Alternatively, the material rod may be selectively moved through the wall of the housing into the interior of the combustion chamber by a feeder. The feeder includes rollers that are selectively operable for advancing the material rod into the housing. The material moves through a seal at the entry into the housing whereby the ability of the combustion chamber to contain the combustion reaction is preserved.

A product collector may be provided in conjunction with an exit from the housing. The exit comprises a port from the interior of the housing and a source of controlled back pressure for maintaining the gas pressure in the housing and for containing the combustion reaction in the housing. The product collector may include a conveyor to move product powder from the housing.

The feeder may be operated to continuously move material into the housing as combustion occurs. After a number of combustion steps have been carried out to oxidize new material being advanced into the chamber, the resulting powder may be removed from the chamber. Thus, oxide powders are produced on a batch basis, with minimized opening and closing of the combustion chamber. If the oxidation combustion is carried out at atmospheric pressure, the process can be carried on continuously, with continuous feeding of the material and use of the product collector to collect the product without opening the housing.

The present invention provides method and apparatus for producing oxide powders of metals or of metal alloys relatively rapidly.

DESCRIPTION OF PREFERRED EMBODIMENTS

Figure 1:
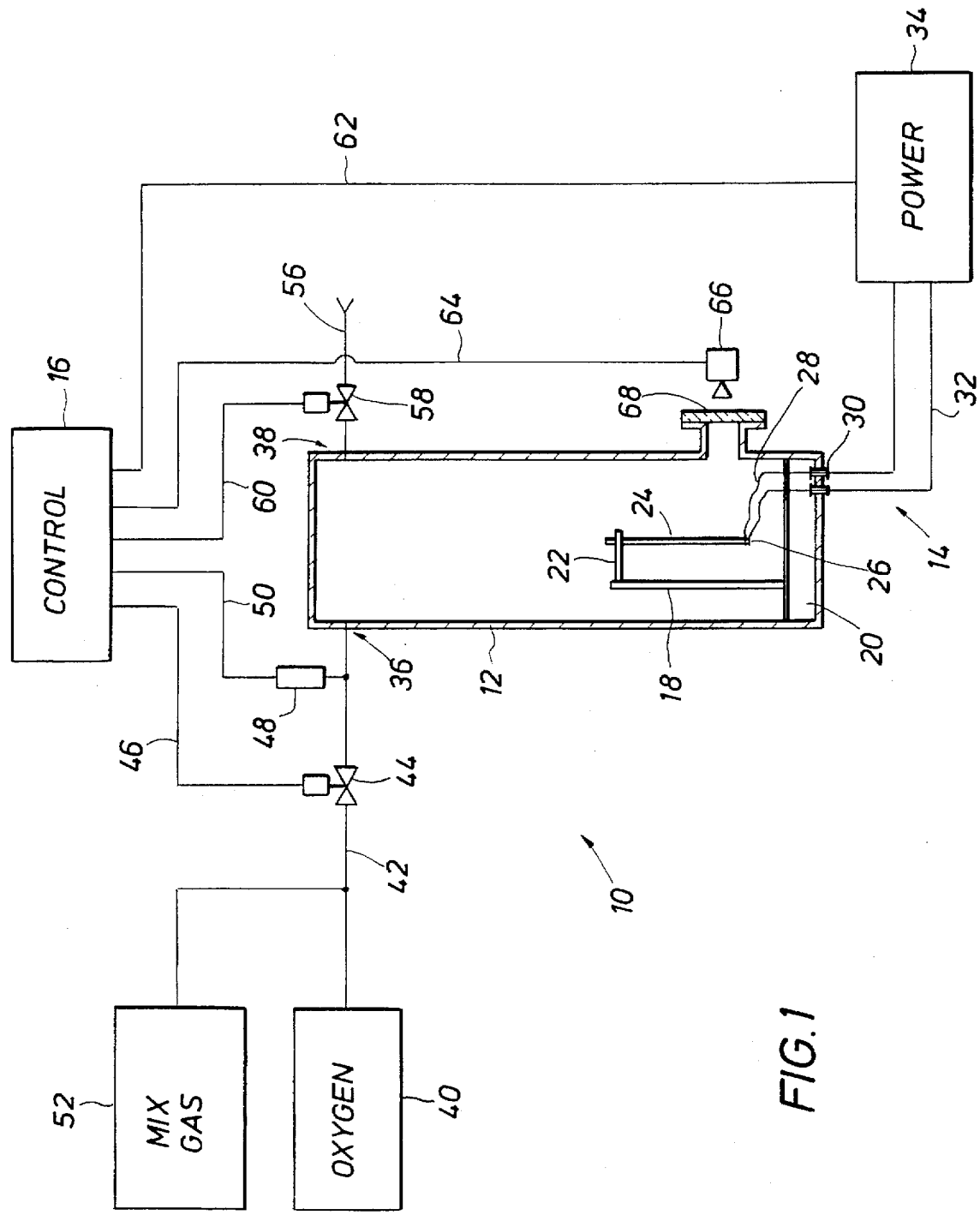
FIG. 1 is a schematic illustration of a system for producing oxides of metals or metal alloys according to the present invention, including a combustion chamber and control and supply components.

A system for producing metal and metal-alloy oxides according to the present invention is shown generally at 10 in FIG. 1. The system 10 includes a housing 12, an igniter shown generally at 14, and control circuitry 16 for controlling the operation of the apparatus. The housing 12 may be a combustion chamber generally in the form of the combustion chamber disclosed in U.S. Pat. No. 4,990,312 discussed above. The chamber 12 is constructed to contain gas under pressure, up to 10,000 psig for example, and to also contain a combustion reaction as described below.

The interior of the chamber 12 is protected from ignition or other damage by appropriate substances (not shown) such as a layer of ceramic insulation lined with burn-resistant metal alloys such as copper base, nickel base, or cobalt base alloys. Also, the chamber 12 may be opened to gain access to the interior thereof.

Within the housing 12 a stand 18 extends upwardly from a base 20 of the housing, and supports a holder 22 from which an elongate sample 24 of the material from which an oxide is to be made is suspended. The sample of material 24 is in the form of a rod or wire, generally on the order of one-eighth inch in diameter.

The igniter includes a thermoelectric element 26 that is affixed to the material 24 in any suitable fashion, such as by wrapping the element around the material rod. A pair of electrical lead wires 28 extends from the ends of the element 26 to terminals 30 passing through, and electrically insulated from, the wall of the chamber 12. The terminals 30 are constructed and mounted on the housing 12 to withstand high pressure within the housing as well as the effects of combustion of the sample of material 24 in the housing. Two electrical leads 32 extend from the terminals 30 to a source of power 32 external to the housing 12. Operation of the power supply 32 generates electric current in the circuit including the electrical leads 32, the terminals 30 and the conductors 28 to generate heat by the thermoelectric element 26, raising the temperature of the end of the material rod 24 to the ignition temperature of the material.

The housing 12 features an entry port shown generally at 36 and an exit port shown generally at 38 for introducing gas into the housing and for venting gas from within the housing, respectively. The ports 36 and 38 may include appropriate gas line connectors (not shown) for receiving gas-conducting conduits, with the connectors constructed and mounted for exposure to high pressure gas as well as combustion of material 24 within the housing 12. A source of oxygen under pressure 40 is connected to the entry port 36 by a fluid flow line 42. A regulator, or valve 44 is interposed along the fluid line 42 between the oxygen tank 40 and the housing 12 to control the supply of oxygen to the chamber. The control valve 44 may be of the solenoid type, for example, and is connected to the control circuitry 16 by appropriate connectors 46 whereby electrical signals are selectively transmitted to operate the valve to so control the flow of gas to the housing. A pressure sensor 48 is operatively connected to the fluid line 42 between the valve 44 and the housing entry port 36 to monitor the pressure of the gas entering the housing. Electrical leads 50 connect the pressure sensor 48 to the control circuitry 16 whereby appropriate signal from the sensor are conveyed to the circuitry for use by the latter for controlling the operation of the system 10.

As an option, another source of gas under pressure 52 may be provided for supplying a gas other than oxygen for mixing with oxygen and introduction into the housing along the fluid line 42, for example. Additional valve and pressure sensing devices (not shown) may be provided for controlling the flow of the mix gas from its source 52.

Gas is vented from the housing 12 by way of the exit port 38 and a fluid flow line 56. A solenoid type valve 58 is positioned to control the flow of gas along the line 56 and, therefore, from the interior of the housing 12. Electrical leads 60 extend from the vent valve 58 to the control circuitry 16 whereby appropriate signals from the circuitry operate the valve 58. Thus, by by, selective operation of the valves 44 and 58, based at least in part on pressure information obtained by the sensor 48, the pressure of gas in the chamber 12 is controlled.

The control circuitry 16 also conveys appropriate operating signals to the igniter power supply 34 by way of electrical leads 62. Further, Electrical leads 64 may connect the control circuitry 16 to optional monitoring equipment, such as a camera 66 or other optical sensor, as shown in FIG. 1, for monitoring activity within the chamber 12. For example, a flash of light accompanying combustion within the chamber 12 may be used as one indicator that the material 24 has in fact been ignited. A viewing port 68 is provided in the wall of the housing for optical inspection such as by the camera 66. The viewing port 68 is constructed and mounted to withstand high gas pressure within the housing 12 as well as the effects of combustion of the material 24 to form one or more oxides thereof.

To obtain oxide powder of a metal or metal alloy, a sample of the material in the form of the rod or wire 24 is suspended from the holder 22 and a thermoelectric element 26 is wrapped around the bottom end of the rod. With the element 26 connected to the terminals 30 by the leads 28, the chamber 12 is closed and sealed against internal high pressure. The external gas valves 44 and 58 are operated by the control circuitry 16 to establish an oxygen, or oxygen enriched, atmosphere within the chamber 12 at a selected pressure. The pressure within the chamber 12 may be monitored by use of the pressure sensor 48 conveying pressure data to the circuitry 16. The power supply 34 is operated by the circuitry 16 to heat the thermoelectric element 26. The element 26 ignites the rod quickly and cleanly so that combustion of the rod material occurs in the oxygen of the atmosphere within the chamber 12, resulting in oxidation of the rod material to form one or more oxides of the material in powder form. The chamber 12 is vented by operation of the vent valve 58 and is opened. The oxide powder is removed from the chamber 12, and can be sized by screening, for example, for its end-use application.

Figure 2:
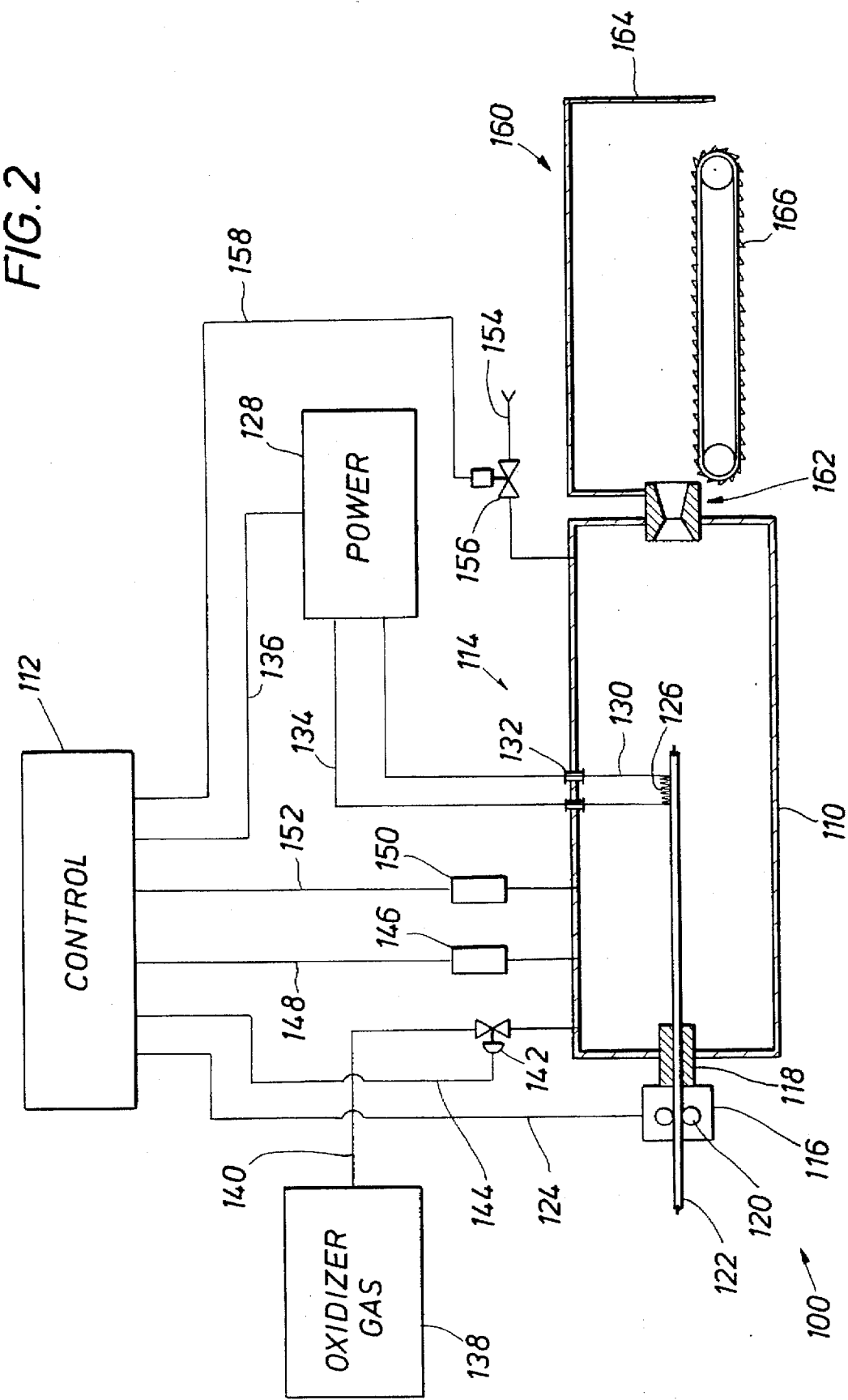
FIG. 2 is a schematic illustration of another system for producing oxides of metals or metal alloys on a batch basis or a continuous basis according to the present invention, including a combustion chamber, a material feed system and a product removal system, and control and supply components.

An alternate form of a system for producing metal oxides and metal-alloy oxides according to the present invention is shown generally at 100 in FIG. 2 The system 100 includes a housing in the form of a combustion chamber 110, control circuitry 112, and an igniter shown generally at 114.

The housing 110 may be constructed generally according to the manner of construction of the housing 12 in FIG. 1, including having protective linings within the housing and appropriate terminals and port connectors, for example, to accomodate high pressure gas within the housing as well as to contain combustion within the housing. The housing 110 is able to continuously receive material to be made into oxides, and to have products removed from the housing without necessarily opening the housing. In particular, a feeder 116 is positioned adjacent a port 118 through the wall of the housing 110. The feeder 116 features a drive system including rollers 120. A rod, or wire, of material 122 to be processed in the chamber 110 is selectively advanced by operation of the rollers to be inserted through the port 118 into the interior of the chamber. The rollers 120 are driven by one or more electrical motors (not shown) as part of the feeder 116. Appropriate electrical connectors 124 extend from the control circuitry 112 to the feeder 116 to selectively operate the feeder to turn the rollers 120. The port 118 is a sealed entry, that is, a tight, sliding, seal is maintained by pneumatic pressure between the wall of the chamber 110 at the port 118 and the rod 122 being inserted through the port. When there is no rod 122 positioned in the port 118, the port is sealed shut, the seal at the port opening only to accomodate passage of the rod therethrough. The sealing of the port 118 is tight enough and strong enough to contain high pressure gas within the housing 110 and to withstand the effects of combustion within the housing.

The igniter 114 includes a thermoelectric element 126 that is positioned within the the chamber 110 adjacent the rod 122 of material to be ignited. A pair of electrical leads 130 holds the element 126 in position and connects the element to a pair of terminals 132 passing through the wall of the chamber 110. The terminals 132 are constructed and mounted in the wall of the housing 110 to contain high gas pressure within the the housing and to withstand the effects of combustion within the housing. A pair of electrical conductors 134 connects the terminals to a power source 128, which is connected to the control circuitry 112 by appropriate electrical connectors 136. The control circuitry 112 signals the power source 128 to selectively operate the igniter by sending electric current through the conductors 134, the terminals 130 and the leads 130 to the thermoelectric element 126. The current through the element 126 heats the element to raise the temperature of the adjacent portion of the rod 122 to the ignition temperature of the material of the rod.

A supply of oxygen gas 138 is connected to the housing 110 through a fluid flow line 140. A solenoid type valve, or pressure regulator, 142 is interposed on the fluid supply line 140 between the oxygen supply 138 and the housing 110 to control the pressure of the oxygen in the housing. The valve 142 is connected to the control circuitry 112 by appropriate electrical leads 144 by which the control circuitry is used to operate the valve to so control the oxygen pressure in the housing 110. A pressure sensor 146 is connected to the chamber 110 to sense the pressure within the chamber. Appropriate electrical leads 148 convey electrical signals from the pressure sensor 146 to the control circuitry 112 that are indicative of the pressure. within the housing 110. A temperature sensor 150 is connected to the chamber 110 to sense the temperature within the chamber. Appropriate leads 152 convey signals from the temperatue sensor 150 to the control circuitry 112 that are indicative of the temperature within the housing 110. A gas vent line 154 is provided for venting gas from the chamber 110. A solenoid valve 156 is positioned on the vent line 154 and connected to the control circuitry 112 by appropriate leads 158 whereby the circuitry operates the valve to selectively vent gas from the chamber.

A product collector is shown generally at 160, positioned in conjunction with a chamber exit port indicated generally at 162. The product collector 160 includes a collection processor 164 and a conveyer 166 for moving the collected product. The exit 162 includes a back pressure control device having an office through which product to be removed from the chamber 110 flows, along with excess oxidizer gas, while simultaneously maintaining the oxidizer pressure to support combustion in the housing, and withstanding the effects of combustion in the chamber.

The feeder 116 may be selectively operated to continuously feed the metal or metal alloy rod 122 into the combustion chamber 110 as the chamber is charged with the selected pressure of oxygen by operation of the entry valve 142, and the igniter is operated to cause combustion of the rod within the chamber. After each combustion of material 122 in the chamber 110, more oxygen is introduced into the chamber and the feeder 116 advances more material 122 into the chamber. The combustion cycle is repeated without the chamber 110 being opened to remove product oxide powder, with the exit 162 maintained closed by back pressure. Eventually, after some number of combustion cycles is carried out, the chamber 110 is opened and oxide powder removed, or the powder is blown out of the exit 162. In this way, large batches of oxide powder can be produced while minimizing the opening and closing of the combustion chamber 110 to remove the oxide. For metals and metal alloys that undergo combustion at atmospheric pressure, the product collector 160 may be operated on a continuous basis with the feeder 116 rather than on a batch basis. Then, excess oxidizer carries oxide powder out through the exit 162 while the back pressure maintains sufficient oxidizer in the chamber 110 to support combustion, in conjunction with operation of the gas entry valve 142 which provides adequate flow of oxygen into the chamber. In the product collector 160 the flow of oxidizer and product is diffused, and the product powder is delivered for further handling.

The present invention provides method and apparatus for producing metal and metal-alloy oxide powders entirely by combustion in pure oxygen, with the combustion being complete. The method of the invention involves relatively few steps. Also, the purity of the product can be controlled by analysis of the material rods and by analysis of the oxygen gas.

The foregoing disclosure and description of the invention is illustrative and explanatory thereof, and various changes in the method steps as well as in the details of the apparatus may be made within the scope of the appended claims without departing from the spirit of the invention.

What is claimed is:

1. An apparatus for the production of metal oxide powders, said apparatus comprising:
   a combustion chamber having a gas inlet port, a gas vent port, and controllable exit and entry ports:
   means for introducing an oxygen enriched gas into the combustion chamber through said gas inlet port;
   means for sensing the pressure of the oxygen enriched atmosphere within the combustion chamber;
   means for continuously moving through said entry port a metallic material to be oxidized in said combustion chamber;
   means for igniting said metallic material, said means for igniting including a thermoelectric element positioned within the housing in proximity to said metallic material;
   control circuit means for selectively operating said means for igniting to energize the thermoelectric element and heat the metallic material to its ignition temperature whereby combustion of said metallic material results in production of metal oxide in powder form;
   means controlled by said control circuit means for continually moving the product metal oxide through the exit of the combustion chamber and for maintaining the pressurized atmosphere within said chamber; and
   product collector means located in proximity to said exit port in a position to receive the product metal oxide exiting from the chamber and controlled by said control circuit means to convey the product to a desired location.

2. An apparatus as set forth in claim 1 wherein the product collector means comprises a conveyor.

3. An apparatus as set forth in claim 1 wherein said control circuit means is responsive to said pressure temperature sensing means for continuously controlling the introduction of the oxygen enriched gas into the combustion chamber and the release of gas through said vent port.

4. An apparatus as set forth in claim 1 wherein said means for igniting includes means for electrically coupling said thermoelectric element to an electric power source located outside said combustion chamber.

5. An apparatus as set forth in claim 1 including valve means controllable by said control circuit means for selectively venting gas from the combustion chamber.

6. An apparatus as set forth in claim 3 including valve means controllable by said control circuit means for selectively venting gas from the combustion chamber.

7. An apparatus as set forth in claim 1 wherein said means for continuously moving metallic material through said entry port comprises a roller drive system with rollers for supporting the metallic material, said drive system being controlled by said control circuit means.

* * * * *